US006796734B2

(12) United States Patent
Ye

(10) Patent No.: US 6,796,734 B2
(45) Date of Patent: Sep. 28, 2004

(54) KEYLESS KEYBOARD AND A METHOD OF USING THEM

(76) Inventor: Liangang Ye, 13926 Queensbury La., Houston, TX (US) 77079

( * ) Notice: Subject to any disclaimer, the term of this patent is extended or adjusted under 35 U.S.C. 154(b) by 0 days.

(21) Appl. No.: 10/314,516

(22) Filed: Dec. 9, 2002

(65) Prior Publication Data

US 2003/0106781 A1 Jun. 12, 2003

Related U.S. Application Data

(60) Provisional application No. 60/340,768, filed on Dec. 11, 2001.

(51) Int. Cl.$^7$ .............................. B41J 5/12; G06F 1/16
(52) U.S. Cl. ....................................... 400/472; 361/680
(58) Field of Search ................................ 400/472, 100, 400/414, 653; 345/76, 173, 168; 341/20, 22; 361/680, 681

(56) References Cited

U.S. PATENT DOCUMENTS

| | | | | | |
|---|---|---|---|---|---|
| 5,486,112 | A | * | 1/1996 | Troudet et al. | 434/250 |
| 5,595,449 | A | * | 1/1997 | Vitkin | 400/472 |
| 5,616,897 | A | * | 4/1997 | Weber et al. | 200/5 A |
| 5,712,760 | A | * | 1/1998 | Coulon et al. | 361/680 |
| 5,880,712 | A | * | 3/1999 | Goldman | 345/168 |
| 6,181,992 | B1 | * | 1/2001 | Gurne et al. | 701/29 |
| 6,351,225 | B1 | * | 2/2002 | Moreno | 341/22 |
| 6,390,699 | B1 | * | 5/2002 | Lam | 400/472 |
| 6,476,733 | B1 | * | 11/2002 | Amiri | 341/20 |
| 6,478,676 | B1 | * | 11/2002 | Dayan | 463/17 |
| 6,587,097 | B1 | * | 7/2003 | Aufderheide et al. | 345/173 |
| 2002/0084920 | A1 | * | 7/2002 | Olodort et al. | 341/22 |
| 2002/0161461 | A1 | * | 10/2002 | Lobb et al. | 700/91 |
| 2002/0171610 | A1 | * | 11/2002 | Siwinski et al. | 345/76 |
| 2003/0063775 | A1 | * | 4/2003 | Rafii et al. | 382/106 |
| 2003/0099086 | A1 | * | 5/2003 | Chuang | 361/680 |

FOREIGN PATENT DOCUMENTS

| | | |
|---|---|---|
| WO | WO99/24962 | 5/2000 |
| WO | WO99/24963 | 5/2000 |
| WO | WO00/60438 | 10/2000 |

OTHER PUBLICATIONS http://nmbtechn.iserver.net/products/kbrds/note85a.html, no date.
NMB Technologies Inc. Model Series RT–6800W advertisement, no date.
http://www.elotouch.com/About/facts.asp.
http://www.usar.com/indact/touchscr_art.htm.
http://www.jaycommi.com/clearswitch.html.
http://www.mwbrooks.com/dvorak/layout.html.

* cited by examiner

*Primary Examiner*—N. Le
*Assistant Examiner*—Hoai-An D. Nguyen

(57) ABSTRACT

A novel keyless keyboard uses membrane switches or touch screen to generate keystroke signals, without traditional keycaps. The keyless keyboard can be folded to further reduce its size during storage. The keyless keyboard unfolds into a keyboard of normal desktop keyboard size for easy use. When touch screen is used, the keyboard is also a display screen.

5 Claims, 3 Drawing Sheets

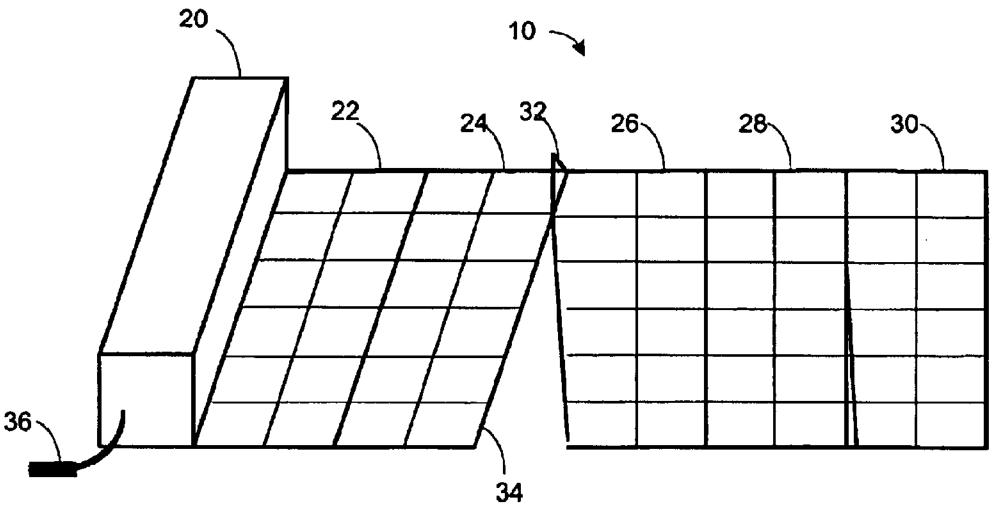
Fig. 1
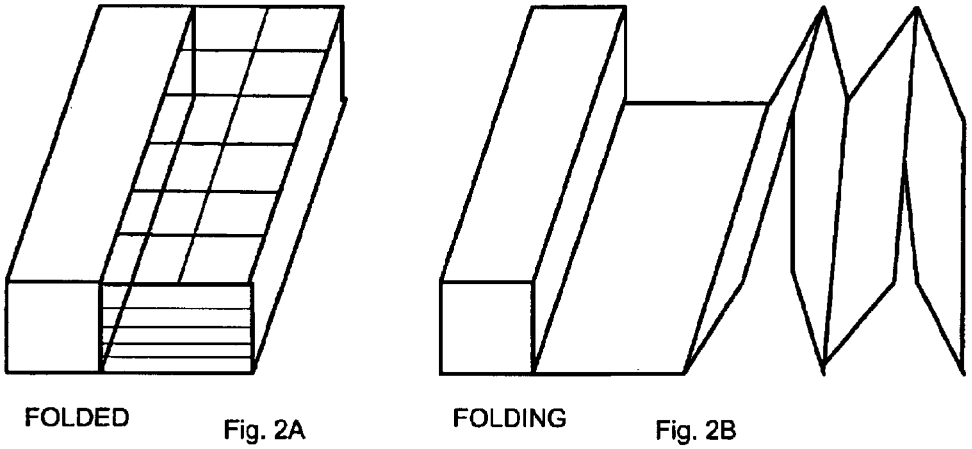
Fig. 2A
Fig. 2B
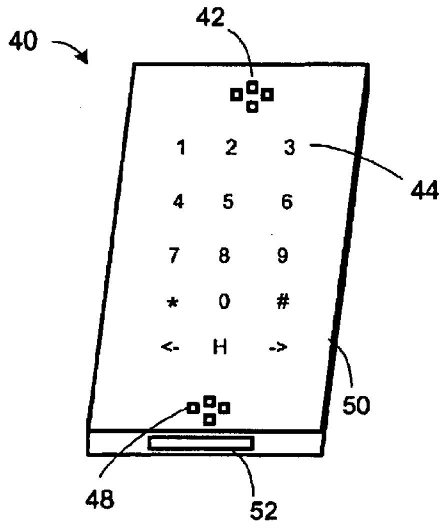
Fig. 3

80

90

KEYLESS KEYBOARD AND A METHOD OF USING THEM

RELATED APPLICATION

This patent application claims priority from U.S. provisional application filed on Dec. 11, 2001, Ser. No. 60/340,768 with the same title under 35 U.S.C. § 119(e).

BACKGROUND OF THE INVENTION (1) Field of the Invention

This invention relates to electronic manual input devices, in particular relates to computer keyboards.

(2) Description of the Related Art

With the miniaturization of digital electronics and their increasing functionality, computers are getting smaller and smaller. Similarly, small electronic devices become capable of performing more and more functions. The handheld computers, such as Palm Pilot, Handspring, Pocket PCs are not only capable of being Personal Digital Assistants (PDA), which keep contact information, To-Do lists, Calendar and short memos, they are now having enough computing power and memories to be bona fide personal computers. Each of them is small enough to fit in a man's shirt pocket or one's hand. To maintain the compact size, most handheld computers do away with traditional keyboards. The main input devices for most handheld computers are styluses. The styluses are fine if one only need to input a person's phone number or similar very minimum data entry. It becomes awkward, slow and painful when the data entry requirement is slightly more demanding, such as entering a long address, taking a note of an telephone call or To-Do item or taking note for a meeting or a lecture. Their input speeds are greatly reduced comparing to ten-finger touching typing using a regular keyboard. Using a stylus is almost equivalent to one-finger typing. Some of PDAs allow a combination of point and click typing and pen-based scribing. Some claim the combined clicking/scribing speeds up to 40 WPM, very close to regular keyboard typing, e.g. Silverscreen, a software-keyboard available for Palm PDA.

Similarly, other electronic gadgets, such as cellular phones, are small and have fairly large memories and many functionalities. But many of them only have numeral keys. To enter characters into the memory, one has to use numerical coding, i.e. presses a number key several times to enter one character or number. For example, on a Nokia 3390 cellular phone, to enter a letter "a", one needs to press 2, i.e. press number key 2 once and pause before pressing other keys. To enter a letter "o", one has to press 666, i.e. press number key 6 three times because "o" is the third letter on key 6. To get a number 6, one has to press 6666, i.e. press number key 6 for four times, because 6 is the fourth symbol on key 6. It is very cumbersome.

The manual input device becomes increasingly the component that resists being miniaturized. A Go-type keyboard is a step forward in relieving the manual input device problem for handheld computers. But the Go-type keyboard is significantly larger than the Palm handheld computer and keys on the keyboard are significantly smaller when in use than the traditional keyboard. The Palm folding keyboard is smaller. A Palm folding keyboard is small enough to fit in a big pocket when not in use. It is only a little bit longer and wider than a Palm™ computer and about twice as thick as a Palm™. When the keyboard is extended and ready to use, it has a keyboard the size of a normal desktop computer keyboard. The keys on the keyboard are normal size and the travel distance of keys when depressed is about the same as the keys on a notebook computer keyboard or about half of that as the keys on a desktop computer keyboard. A Palm folding keyboard is significantly smaller when folded than a full-size desktop computer keyboard, i.e. about ¼ of a regular keyboard. But it is still too big to carry with a Palm simultaneously in a shirt pocket. A Palm folding keyboard is significantly more expensive than a regular desktop keyboard, about $100 for a Palm folding keyboard versus $15 or less for a regular desktop keyboard.

Most of the desktop keyboards, Palm folding keyboards or even the miniaturized keyboards have plastic keycaps. Under those keycaps, there are springs or similar resilient material, which will spring back to it original position when not pressed. When a user hits a key, the spring will be depressed, a rod underneath the keycap or other mechanic component will hit a plastic electrical switch, and the switch closes an electric circuit. When the finger releases the keycap, the string under the keycap returns to neutral position, so the plastic electric switch opens again. The open or close of such an electric switch will generate a signal, which may or may not be forwarded to an input driver. Eventually, the signal will be forwarded to a dedicated microprocessor or a Central Processing Unit (CPU) and be processed as the corresponding keystroke represented by the keycap on the keyboard. The mechanical movement of the keycaps on the keyboard is transformed into electrical signal and processed by CPU as an input keystroke. The sizes of those keycaps on a keyboard are mostly determined by the sizes of human fingers. To make the keycaps fit the fingers, the size of the keycaps cannot be too small, otherwise, the finger will not be able move and hit the correct keys all the time. Smaller keycaps, as in the Go-type keyboard are not as comfortable or accurate as those full-size keycaps as in the desktop keyboard or Palm folding keyboard. If the keycaps are too big, then the fingers have to travel more to hit a particular keycap. That increases chances of hitting a wrong, adjacent keycap. That also may increase hand fatigue. Some keyboard manufacturers have recognized such problems and have developed smaller keyboards for persons with smaller hands and fingers, such as children.

Touch screens are used increasingly common. On a screen, part of the screen may be shown as a simulated desktop keyboard. When a human finger touches a location inside a simulated key, the touch screen generates a signal representing the coordinates of the hit location. A program, such as keyboard driver, interprets such a signal as a keystroke, as if one typed the same key on a regular keyboard. Those touch screen keyboards are usually in vertical planes, as they are usually the bottom portions of vertical displaying screens. The touch screen eliminates the need of additional keyboards, makes the system of compact and integrated with fewer mechanical accessories. A touch screen is also easier to clean or sanitize, where public health is of concern. But touch screens are intended for inputting minimum amount of information, such as selecting an item from a list or inputting a person's name, rather than heavy-duty keyboards, such as for taking notes or writing office memoranda. There are touch screens displaying on near horizontal plans such in some instrument panels in control rooms in many manufacturing plants. There, simulated keyboards on a horizontal plane may be used occasionally as if they are desktop keyboards.

BRIEF SUMMARY OF THE INVENTION

The present invention takes advantage of certain features of manual input devices, such as a typical keyboard, and minimizes the sizes of them. The keyless keyboard in the present invention does not use any keycaps. The present invention may have a film of membrane switches with printed circuits or touch screens. The film may have a plurality of areas representing keys. The film may be folded many times to reduce the size. A connector connects the keyboard to electronic devices, such as PDAs, cellular phones or desktop computers.

BRIEF DESCRIPTION OF DRAWINGS

A better understanding of the invention can be had when the following detailed description of the preferred embodiments is considered in conjunction with the following drawings, in which:

FIG. 1 is a general overview of the keyless folding keyboard in an unfolded position for normal use.

FIG. 2 is a general overview of the keyless folding keyboard in a folded position for storage.

FIG. 3 is a general overview of another embodiment where the keyless folding keyboard is integrated with an electronic gadget, such as a PDA or a cellular phone in folded position.

Figure 4:
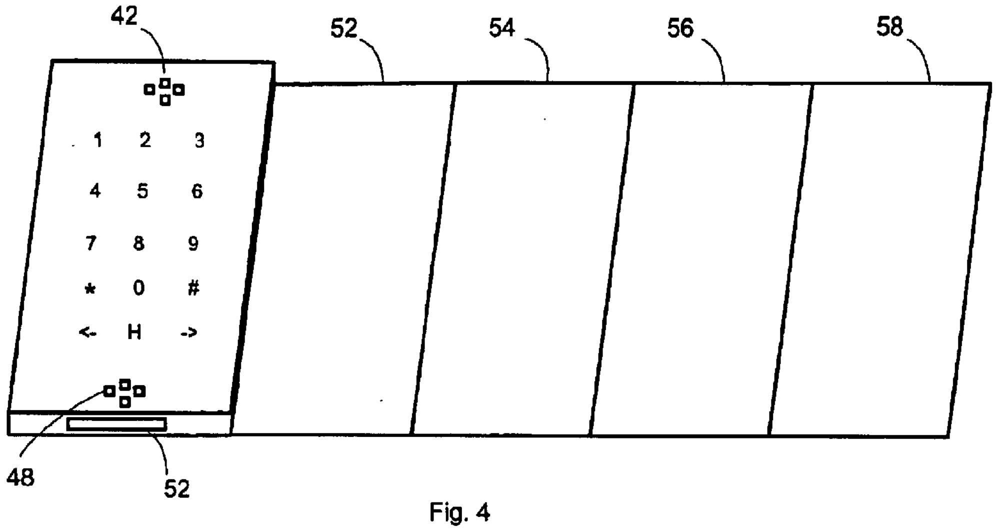
FIG. 4 is general overview of the embodiment shown in FIG. 3 in an unfolded position for typing.

The above drawings are not to scale and for illustrative purpose only.

DETAILED DESCRIPTION OF THE INVENTION

One of the most obvious features of present invention, a keyless keyboard, is that the keyless keyboard does not have any "keys" or keycaps. The keyless keyboard has no apparent moving parts. The present inventor discovers that keycaps are not essential for a keyboard to function as a data input device. Keycaps may be a tradition passed down to modern computer keyboards from their ancestors, i.e. the mechanical typewriters. Keycaps help novel keyboard users or a new user of a particular keyboard to locate the correct keys. They may help keyboard user to locate the home locations of the fingers before typing. They may also provide feedback to a user when a particular key is pressed. But almost all of the above functions of keycaps are either unnecessary or can be had through other devices or methods. With the removal of keycaps, the keyless keyboard in the current invention can be made much smaller than traditional desktop keyboard, while retains the basic function as a manual data input device for computer or other electronic gadgets. When new material, such as touch screen is used, the keyless keyboard in the present invention may have more functions than a traditional desktop keyboard.

Due to the size of the keyless keyboard in the present invention and its simplicity, such a keyless keyboard can be very personalized and can be almost disposable. The surface of a keyless keyboard is essentially flat and smooth. It can be easily cleaned and sanitized, when necessary. But most likely, the cleaning is not necessary, because of any person can keep and carry his own keyboard wherever he goes. There is no need to use or share a public keyboard. A user can just plug-in his own keyless keyboard using the standard keyboard socket/connector in a public computer or electronic device, type in the necessary information, then unplug the keyless keyboard. A next user can similarly use his own keyless keyboard. A public service provider may also make the disposable keyless keyboard available for persons who forget to carry their personal keyboards.

In one embodiment of the present invention, standard membrane switches are used. Generally, standard membrane switches are made of three layers: a top layer with printed circuit on the underside of the top layer, a middle insulation layer, and a bottom layer with a printed circuit on the upper-side of the bottom layer. There are holes/windows in the middle insulation layer, though which the printed circuit on the top layer and the printed circuit on the bottom layer may contact each other. When the top and bottom printed circuit contact to one another, they form a short circuit and generate a keystroke signal. Normally, these they are separated by the middle insulation layer and do not contact each other, so the circuit is open. A user's finger hits a switch on the keyless keyboard, i.e. an area where there is a window/hole, the top layer is pressed downward temporarily and contacts the bottom layer, a short circuit is formed and a signal generated. When the finger is lifted, the top layer returns to its normal position, the circuit is open again. Because the all the layers are very thin, the deformation caused by human fingers during typing are very small, the metal and plastic top layer is flexible and resilient enough to endure many deforming/restoring cycles. The human fingers are softer and having larger surface areas than the impacting rubber rods under the traditional desktop keyboards, so the membrane switches in the current invention have similar useful life expectancy as those more traditional keyboards. But a user may not use the keyless keyboard in the present invention for its full useful life, due to the disposability.

In one embodiment of the present invention, a keyless keyboard 10, as shown in FIG. 1, has several components. There is a housing 20, containing signal processing electronics. At one end of the housing, there is a standard keyboard connector and connector cable 36. This connector connects the keyless keyboard to computers, PDAs or other electronic devices where a keyboard is a useful input device. The connector 36 may be in a numerous other format, such as USB connector, serial connect or device specific connector, such as specifically for Palm Pilot, Nokia cellular phone etc. The housing 20 may contain the standard electronics as in a regular desktop keyboard if they are desired. Or the housing may contain no electronics, if the keyless keyboard is specifically and exclusively used for a Palm Pilot PDA. All the signal-processing functions may be performed inside the Palm Pilot. The connected electronic device may provide the necessary power to the keyboard though the keyboard connector 36.

The housing 20 is electrically connected to key panels 22, 24, 26, 28 and 30. Each key panel may have at lease one column and a plurality of rows. The intersection of a column and a row forms a cell. Each cell contains a membrane switch. There is a folding line between key panels. Along the folding lines, the panels can be folded and stack together for storage, or unfolded and extended flat on a flat surface for typing. The area around a folding line is generally thinner and more flexible than the other areas on a key panel. Between the panel 24 and 26, there may be a split 34 on the lower porting of the folding line and folding line 32 on the top. Near the folding line 32, the key panel can be pushed up out of the flat surface plane. The housing 20, key panels 22 and 24 can be split and arranged at an angle with respect to panels 26 and 28. This way, the key panels are arranged in a more natural way to accommodate the natural posture of user's two hands. The angle may be adjusted. For panels 22, 24, 26 and 28 to remain flat on the flat surface, folding line 32 is pushed up a little bit out of the flat surface plane. All the electric connection between panels 22, 24 and 26, 28 are embedded and through folding line 32. Panel 30 may be an add-on panel, connected to panel 28 near the top row. The electric connection between housing 20 and panel 22, panels 22 and 24, panels 26 and 28 may be confined to only the top row, as between panels 24 and 26, or may be spread in all rows.

FIGS. 2A and 2B show the keyless keyboard in a folded condition and a folding condition for storage. The panels 22, 24, 26 and 28 are folded together towards the housing 20. The connector 36 is withdrawn into the housing 20. Due the more flexible and thinner constructions of the folding lines in between panels, all the layers in the panels are in flat, neutral conditions, without pressure. In one embodiment, the folded keyless keyboard has a dimension of about 90 mm long, 75 mm wide and 15 mm thick, when the membrane switch is about 3 mm thick. The thickness arises mainly from the structural backing of the bottom layer of the membrane switch. In another implementation, the keyless keyboard is thinner, only about 4 mm thick, using 1 mm-thick or less membrane switches including backing. This is about as thick as to stack four plastic credit cards together. If the structural back is not of a concern, i.e. the structural back is not installed, the key panel can be as thin as 0.2 mm or less. The keyless keyboard is less than 1 mm thick in folded position. The keyless keyboard is smaller than a Palm IIIxe, which is about 120 mm long, 80 mm wide and 16 mm thick, and smaller than a foldable Palm Keyboard, which is about 130 mm long, 90 mm wide and 22 mm thick. At 15 mm, 4 mm or thinner, this keyless keyboard can be easily kept in one's wallet as an independent electronic gadget, or added onto and integrated with any small electronic devices.

FIGS. 3 and 4 show another embodiment of the present invention, a keyless keyboard 50 integrated with an electronic gadget 40, such as a cellular phone or a PDA. The electronic gadget 40 may have the regular features of a cellular phone, such as an earphone 42, a display 44, a microphone 48 and a connector slot 52. On the back of the electronic gadget 40, a keyless keyboard 50 is attached. FIG. 4 shows the electronic gadget 40 with the keyless keyboard 50 unfolded. The keyless keyboard 50 has similar key panels as in keyless keyboard 10 shown in FIG. 1.

Figure 5:
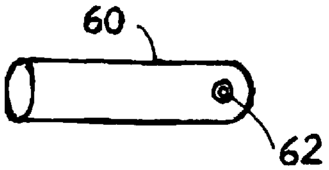
FIG. 5 is typing finger gloves for use when the keyless folding keyboard is made of touch screen.
Figure 6:
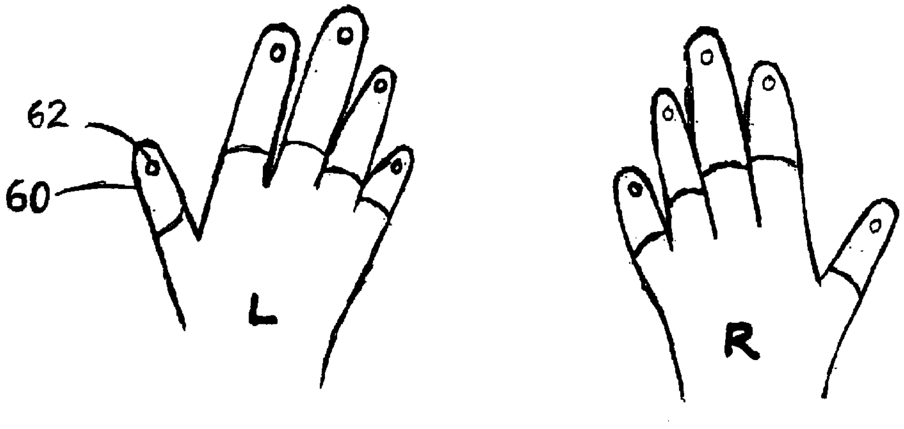
FIG. 6 shows both hands with finger gloves on for typing.

To increase the efficiency and accuracy of typing, a user may also wear finger gloves with keydots as shown in FIGS. 5 and 6 while using the keyless keyboard or attach keydots directly onto fingers. The finger glove may have a glove 60, made of any kinds of flexible fabric, plastic or elastic films. At the underside of the closed end, a small dot or keydots 62 is attached to the glove 60. This keydots 62 may be made of any kinds of rubber or plastic or other materials that are less flexible or harder than the pad of a user's finger. These keydots 62 may hit the key area during typing, before a user's finger hit those areas. The harder and better-defined shapes of the keydots 62 may have more precise hits on the key areas and have a better close/open switch response from the membrane switches. FIG. 6 shows a user with finger gloves 60 on all fingers when using a keyless keyboard. The finger gloves may be made of very thin material so they will not interfere with a user's other activities, such as writing with a pen or stylus, holding a cup of coffee etc. The keydots 62 may also be made for single use. A keydot 62, made from plastic or rubber may take the shape of a small disk, such a medicine tablet, where one side of the tablet has adhesive and can be adhered to a user's finger temporarily and the other side of the tablet is smooth. A user can adhere the small dot 62 on the desired fingers, for example the pinkies and thumbs when typing on a keyless keyboard. The user can remove the small dot 62 when finishing typing.

Figure 7:
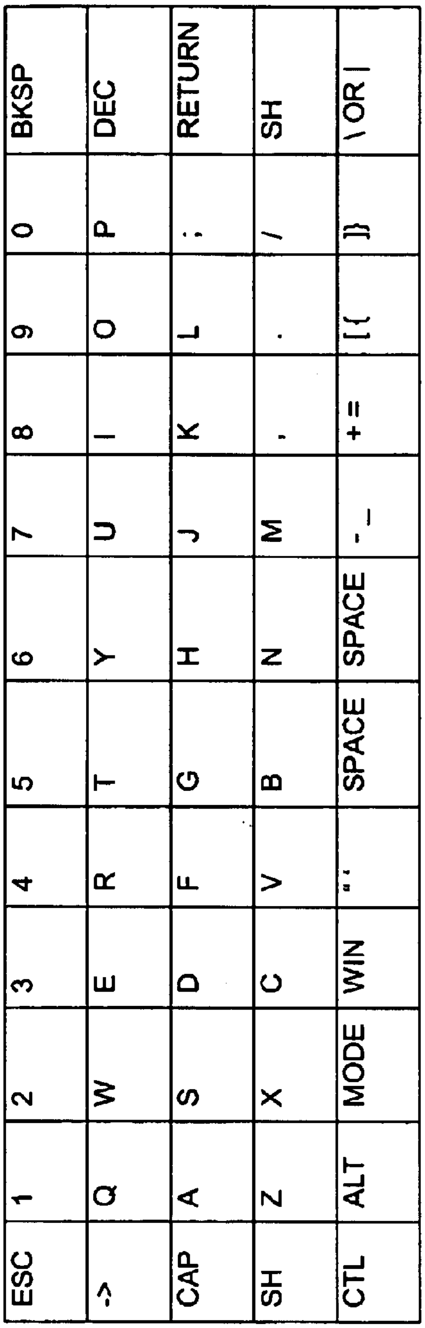
FIGS. 7 and 8 show two key arrangements of the keyless keyboard.
Figure 8:
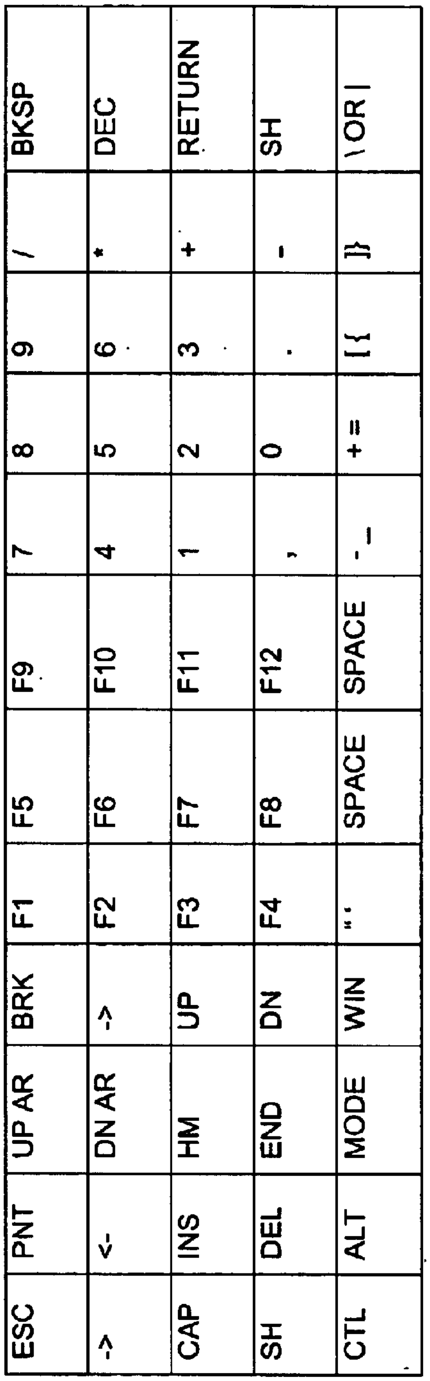

FIGS. 7 and 8 show some illustrative arrangement of key areas on the keyless keyboard. The arrangements in FIG. 7 and FIG. 8 can be switched from one to another by toggling the "mode" key. The arrangement in FIG. 7 is essentially the standard QWERT keyboard. The minor differences include that all the key areas are arranged in straight columns and rows. The staggered key arrangement is probably another artifact from old mechanical typewriter. There is no real need for staggered key arrangement. It is easier for a user's finger to move in a straight motion, up or down, left or right. There are folding lines in between key panels, for example between the column 2wsx and 3edc. In the embodiment shown in FIGS. 7 and 8, each key panel has three columns of key area. Each key panel may also have only two or even one columns, depends on the trade-off between the width and thickness of the resulting keyboard. The fewer columns in a key panel reduce the width of a folded keyboard, but increase the number of panels and increase the thickness of the folded keyboard. There is a split between 5tgb and 6yhn, which separate the left-hand key areas and the right-hand key areas. The split between 5tgb and 6yhn makes is possible to arrange the two panels in an angle respect to one another to fit the natural posture of left and right hands during typing.

The end user can rearrange all the keys, through reprogramming the electronic processing device in the housing 20, or reprogramming the keyboard driver in a computer or PDA if no electronic processing device is installed in the housing 20. Those keys along the outer left, bottom and right edges do not change when "mode" is toggled on or off. FIG. 8 shows an illustrative arrangement after "mode" is toggled. There can be more than one "mode" key on the keyless keyboard, such that more unique keys or function keys can be made available.

The keyless keyboard 10 can also be made from touch screens. Instead of using membrane switches, touch screens can be used to combine the input device (keyboard) and display device (monitor or screen) together. Each key panel, as shown in FIG. 1, may be a touch screen, 22, 24, 26 and 28. Screens 22 and 24, 26 and 28 are mechanically connected together at the folding lines, such that they can be folded along the folding line for storage and unfolded to lay flat on a flat surface for use. All the screens, 22, 24, 26 and 28 are electronically connected at the top row. There are folding lines near the folding line 32 on key areas of number key "5" and number key "6." When the left panels and the right panels are split along the separate line 34, the corners of "5" and "6" can flip upwards to left panels and right panels flat.

Each key panel may have three main layers: on the top is a touch sensitive screen, such as the common resistance touch screen; in the middle is an LCD and on the bottom is a structural backing. The touch screen layer and the LCD layer may have several sub-layers, for example, the LCD may have several light conditioning layers on the main liquid crystal layer. But even with all those layers, a single key panel may still be less than 1 mm thick.

When the keyless keyboard is integrated to an electronic gadget, such as in FIGS. 3 and 4, the key panels 52, 54, 56 and 57 all have two functions: as display screen and keyboard input. They can be used as an extended screen of the standard screen on the top surface 44 of the electronic gadget. They can also be used as simulated keyless keyboard for input, not only as a keyboard, but also as a pointing device, as in a touch pad. Both the display function and the input function can be served simultaneously. Due to the size of the touch screens, the resulting keyless keyboard/display can be even thinner than the membrane switch type of keyless keyboard. When touch screen is used and integrated to an electronic gadget, the touch screen not only provides a convenient way for manual inputting data, it also extended the display screen significantly. When the keyless keyboard contains four key panels, the key panels increase the display screen four times the original display screen on the top surface of the electronic gadget, making the electronic gadget much more useful and more appealing for displaying pictures, especially motion pictures. When the 4-key-panel keyboard is unfolded, the screen is about 90 mm high and 216 mm wide, about 250×550 pixels, very close to the amount of pixels on a regular TV screen.

When touch screen is used to implement the present invention, a powerful small electronic gadget can become a real handheld personal computer. It can have all the amenities a laptop or even a desktop personal computer can provide, such as a large screen, CD quality audio, and a full size keyboard, but still be small enough to be held in one's hand or pocket.

The keyless keyboard in the present invention may also be expanded indefinitely by adding extra key panels, as shown in FIG. 1, for example, a dedicated numerical keypad may be added to the keyless keyboard. Key panel 30 may be connected to key panel 28 on the top row of key panel 28, through exposed printed circuit board. Key panel 30 may be attached on key panel 28 mechanically by adhesive.

While the preferred embodiment of the invention has been illustrated and described, it will be appreciated that various changes can be made therein without departing from the spirit and scope of the invention.

What is claimed is:

1. An apparatus for data input into an electronic device, comprising:

a plurality keypanels and a fold line in between tow adjacent keypanels, along the fold lines, the keypanels can be folded, wherein the keypanels from substantially smooth surface when unfolded, wherein the surface is divided into a plurality of keyareas and a unique keystroke signal can be generated by the keyarea when the keyarea is pressed; and a connector through which the signals from keypanels are transmitted to the electronic device;

wherein the apparatus comprises more than two keypanels and each keypanel bus a top portion and a bottom portion;

wherein the second panel and a second panel are continuously connected along the fold line between them at both top and bottom portion; and wherein the second panel and a third panel are connected on the top portions and not connected on the bottom portion where the bottom portions can be separated.

2. The apparatus as in claim 1, further comprising:

a fourth panel connected to the third panel on both top portion and the bottom portion; and an add-on panel, wherein the add-on panel has a top portion and a bottom portion, and wherein the top portion of the add-on panel is removably electronically connected to the top portion of the fourth panel.

3. The apparatus as in claim 2, wherein all panels comprising touch screens and display screens, wherein add-on panels increase the display screen size and provide additional keys.

4. A method for inputting data using a keyless keyboard by a human user to an electronic device, wherein the keyless keyboard having a first keypanel, a second keypanal and a third keypanel, wherein each keypanel having top portion and a bottom portion, wherein the keypanels having smooth surface, the method comprising:

connecting the keyless keyboard to the electronic device;

unfolding the keyless keyboard on a flat surface;

splitting the bottom portion between the second and third keypanel; and hitting the corresponding keyarea with finger to input the desired key.

5. The method as in claim 4 further comprising:

attaching keydots to the user's fingers; and hitting a desired keyarea on the keyless keyboard with a finger that is covered by a keydot.

* * * * *